(12) United States Patent
Caprioli et al.

(10) Patent No.: US 9,501,687 B2
(45) Date of Patent: Nov. 22, 2016

(54) PREDICTIVE MODELING RELATING MOLECULAR IMAGING MODALITIES

(71) Applicant: Vanderbilt University, Nashville, TN (US)

(72) Inventors: Richard Caprioli, Brentwood, TN (US); Raf Van de Plas, Nashville, TN (US)

(73) Assignee: Vanderbilt University, Nashville, TN (US)

(*) Notice: Subject to any disclaimer, the term of this patent is extended or adjusted under 35 U.S.C. 154(b) by 10 days.

(21) Appl. No.: 14/402,909

(22) PCT Filed: May 21, 2013

(86) PCT No.: PCT/US2013/042059
§ 371 (c)(1),
(2) Date: Nov. 21, 2014

(87) PCT Pub. No.: WO2013/177189
PCT Pub. Date: Nov. 28, 2013

(65) Prior Publication Data
US 2015/0131888 A1 May 14, 2015

Related U.S. Application Data

(60) Provisional application No. 61/649,527, filed on May 21, 2012.

(51) Int. Cl.
G06K 9/00 (2006.01)
G06K 9/62 (2006.01)
G06T 5/50 (2006.01)

(52) U.S. Cl.
CPC ............ *G06K 9/0014* (2013.01); *G06K 9/629* (2013.01); *G06K 9/6211* (2013.01);
(Continued)

(58) Field of Classification Search
CPC ........................... G06K 9/6255; G06K 9/0014
(Continued)

(56) References Cited

FOREIGN PATENT DOCUMENTS

WO  2004036591 A1  4/2004
WO  WO 2004036591 A1 *  4/2004

OTHER PUBLICATIONS

Hill et al, "A Strategy for Automated Multimodality Image Registration Incorporating Anatomical Knowledge and imager Characteristics" Information Processing in Medial imaging, vol. 687, Jan. 1993, p. 162.*

(Continued)

*Primary Examiner* — Gregory F Cunningham
(74) *Attorney, Agent, or Firm* — Tarolli, Sundheim, Covell & Tummino LLP (57) ABSTRACT

Systems and methods are provided for generating a model relating parameters generated via a first molecular imaging modality to parameters generated via a second molecular imaging modality. First and second feature extractors extract, from images of a region of interest obtained via respective first and second molecular imaging modalities, respective sets of parameters for respective first and second sets of locations. A mapping component associates respective locations of the first and second sets of locations according to their spatial relationship within the region of interest to produce a training set. Each example in the training set comprises a set of parameters associated with a location in the first set of locations and a set of parameters associated with a location in the second set. A modeling component generates a predictive model relating the parameters associated with the first modality with at least one parameter associated with the second modality.

20 Claims, 4 Drawing Sheets

(52) U.S. Cl.
CPC ............... *G06K 9/6255* (2013.01); *G06T 5/50* (2013.01); *G06T 2207/10056* (2013.01); *G06T 2207/30024* (2013.01)

(58) Field of Classification Search
USPC .......................................................... 382/133
See application file for complete search history.

(56) References Cited

OTHER PUBLICATIONS

Hill et al., "A Strategy for Automated Multimodality Image Registration Incorporating Anatomical Knowledge and Imager Characteristics" Information Processing in Medial Imaging, vol. 687, Jan. 1993, p. 182.

Viola "Alignment by Maximation of Mutual Information" International Journal of Computer Vision, vol. 24, No. 2, Jan. 1997, p. 137.

Woods et al., "Automated Image Registration: I. General Methods and Intrasubject, Intramodality Validation" Journal of Computer Assisted Tomography, vol. 22, No. 1, Jan. 1998, p. 139.

Bollenbeck et al., "Tree-Dimensional Multimodality Modeling by Integration of High-Resolution Interindividual Atlases and Functional MALDI-IMS Data" Bioinformatics and Computational Biology, Apr. 2009, p. 126.

Seeley, et al., "MALDI Imaging Mass Spectrometry of Human Tissue: Method Challenges and Clinical Perspectives" Trends in Biotechnology, vol. 29, No. 3, Mar. 2011, p. 136.

Sinha et al., "Integrating Spatially Resolved Three-Dimensional MALDI IMS with in vivo Magnetic Resonance Imaging" Nature Methods, vol. 5, No. 1, Dec. 2007, p. 57.

Crecelius et al., "Three-Dimensional Visualization of Protein Expression in Mouse Brain Structures Using Imaging Mass Spectrometry" Journal of the American Society for Mass Spectrometry, vol. 16, No. 7, Jul. 2005, p. 1093.

\* cited by examiner

PREDICTIVE MODELING RELATING MOLECULAR IMAGING MODALITIES

TECHNICAL FIELD

This invention relates to molecular imaging systems, and more particularly, to a predictive model relating molecular imaging modalities.

BACKGROUND

In biological, biomedical, and pharmaceutical research the examination of the spatial distribution of chemical compounds in organic tissue, tissue microarrays, cytospins, or any other form of substrate is a common aim. To accomplish this task, multiple molecular imaging technologies are available based on different physical measurement principles. Molecular imaging is the visualization, characterization, and measurement of biological processes at the molecular and cellular levels in humans and other living systems. Molecular imaging typically includes two-dimensional or three-dimensional imaging as well as quantification over time. Examples of molecular imaging technologies include imaging mass spectrometry, stained microscopy, immunohistochemistry, fluorescence microscopy, Raman spectroscopy, MRI, PET, CT, and Micro-X-Ray Fluorescence. Each of these technologies has its own set of advantages and disadvantages, pertaining to technical aspects such as specificity, sensitivity, accuracy, chemical resolution, spatial resolution, dynamic range, time of acquisition, cost of acquisition, and whether or not the measurement process is repeatable or a destructive test.

SUMMARY OF THE INVENTION

In accordance with an aspect of the present invention, a system is provided for generating a model relating parameters generated via a first molecular imaging modality to parameters generated via a second molecular imaging modality. A first feature extractor is configured to extract, from a first image of a region of interest obtained via the first molecular imaging modality, a set of parameters for each of a first set of locations associated with the first image. A second feature extractor is configured to extract, from a second image of a region of interest obtained via the second molecular imaging modality, a set of parameters for each of a second set of locations associated with the second image. A mapping component is configured to associate respective locations of the first and second sets of locations according to their spatial relationship within the region of interest to produce a training set. Each example in the training set comprises a set of parameters associated with a location in the first set of locations and a set of parameters associated with a location in the second set of locations. A modeling component is configured to generate a predictive model relating the parameters associated with the first molecular imaging modality with at least one parameter associated with the second molecular imaging modality.

In accordance with another aspect of the present invention, a method is provided for modeling relationships between an output of a first molecular imaging modality and an output produced by a second molecular imaging modality. A first image of a region of interest is generated with the first molecular imaging modality at a first spatial resolution to provide a first set of parameters for each of a first set of locations associated with the first image. A second image of the region of interest is generated with the second molecular imaging modality at a second spatial resolution to provide a second set of parameters for each of a second set of locations associated with the second image. The second spatial resolution is different from the first spatial resolution. Respective sets of parameters of the first and second sets of locations are associated according to their spatial relationship within the region of interest to produce a training set. Each example in the training set comprises a set of parameters associated with a location in the first set of locations and a set of parameters associated with a location in the second set of locations. A mathematical model is trained on the plurality of training profiles to model the relationships between the first and second imaging modalities such that a value from the second set of parameters can be predicted as a function of the first set of parameters.

In accordance with yet another aspect of the present invention, a non-transitory computer readable medium stores machine executable instructions for predicting, from a microscopy image of a region of interest, an output of an imaging mass spectrometry (IMS) scan of the region of interest. The instructions include a feature extractor configured to receive the microscopy image and extract a set of predictors for each pixel of the microscopy image. A predictive model is configured to calculate a predicted output value for at least one IMS parameter for each of a plurality of locations within the region of interest according to the extracted sets of predictors. A post-processing component is configured to represent the predicted output values in a human comprehensible form for display at an associated display.

DETAILED DESCRIPTION

A system in accordance with an aspect of the present invention takes measurements made by two or more molecular imaging modalities and captures the cross-corresponding patterns and relationships between these observations in a rigorous mathematical model. If a measured pattern in one modality can be consistently approximated by a combination of measurements from the other modality or the parameters extracted from them, and this relationship can be adequately captured by a model, it becomes possible to predict observations in one technology on the basis of measurements from the other technology. Although in most cases there is no direct interaction between the targets that were imaged via different sensors, cross-modality relationships are often provided indirectly through the underlying biology which is the same for both image sources, such as anatomical regions and cell types. The inventors have found that while these relationships are rarely straightforward enough to be captured by a simple univariate correlation measure, many of them can be adequately described by even a relatively simple multivariate linear model.

Once this cross-modality model has been established, the system uses the model to achieve one or more predictive, filtering, or discovery objectives. For example, the cross-modality model can be used to estimate molecular distributions at spatial resolutions that exceed the native resolution at which they can be physically or practically measured. Further, multi-modal insights are entirely complementary to any information gained through traditional modality-specific workflows and measurements and incur no extra wet-lab or instrumental cost. In fact, cross-modality opportunities are readily available in most multi-modal research being acquired today, which are currently leaving this source of additional insight largely untapped.

In molecular imaging, a growing number of sensor types are available to provide an ever-widening range of information. Since each technology has its own advantages, constraints, and molecular targets, using multiple imaging modalities towards answering a single biological or medical question can provide significant amounts of additional information. Use of systems and methods in accordance with the present invention can help unlock some of the true potential of multi-modal imaging, by actively mining the data from the multiple imaging systems for cross-modality information. Specifically, multi-modality integration is performed in micrometer-scale molecular imaging of organic tissue. In one implementation, imaging mass spectrometry (IMS) measurements, which are rich on chemical information but generally have coarse spatial resolution, are combined with optical microscopy measurements, which have low chemical specificity but high spatial information. The result is a pseudo-modality that integrates the information and advantages from both source modalities. By bridging the gap between multiple data sources, the invention takes the best of both worlds and predicts with a higher fidelity than would be possible from either of them separately.

The modeling of cross-modality relationships between different sensor types allows image fusion to reveal new insights that cannot be gleaned from a single modality, while side-stepping modality-specific constraints. Once cross-modality relationships are discovered, they can be used towards a multitude of predictive applications. In accordance with an aspect of the present invention, the determined model can be selected to provide mathematically meaningful results, such that the contribution of various parameters to the model can be readily ascertained. One application is sharpening, where a first modality having lower spatial resolution, such as IMS, can retain its spectral specificity, while predicted to a higher spatial resolution using a second modality, such as microscopy measurements, as a guide. This method enables prediction of an ion's tissue distribution both at high spatial resolution and with high chemical specificity, a combination of characteristics unavailable via the source modalities separately. Although the confidence of a measurement will exceed that of a prediction, the case studies show that fusion-driven predictions can serve a role where acquiring an actual measurement at the desired spatial resolution is unpractical, uneconomical, or simply unfeasible.

Figure 1:
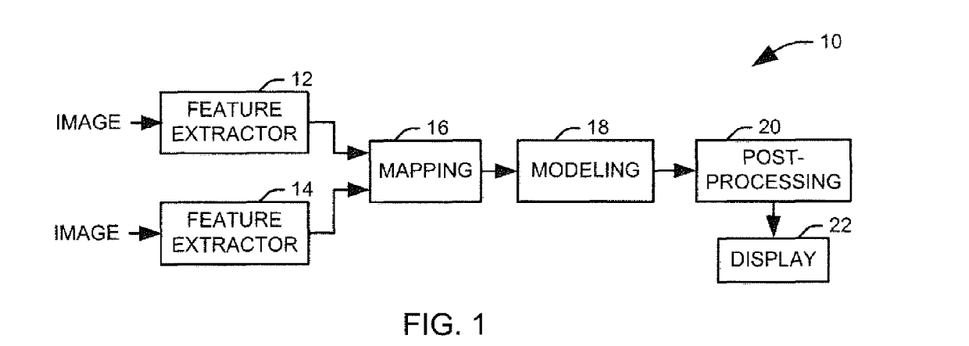
FIG. 1 illustrates a system for generating a cross-modality model relating data from a first molecular imaging modality to data from a second molecular imaging modality in accordance with an aspect of the present invention.

FIG. 1 illustrates a system 10 for generating a cross-modality model relating data from a first molecular imaging modality to data from a second molecular imaging modality in accordance with an aspect of the present invention. The system 10 can be used in any setting where at least two molecular imaging modalities are in use, ranging from pharmaceutical, medical, and forensic industries to material science and semi-conductor industries. In one implementation, the system can be implemented as a series of software instructions stored on a non-transitory computer readable medium executed by a processor. In another implementation, given the massively multivariate nature of the calculations that need to take place concurrently, the system can be implemented in dedicated hardware, using components such as application specific integrated circuits (ASICs), field programmable gate arrays (FPGAs), and filter banks.

The system includes first and second feature extractors 12 and 14 configured to retrieve representations of a region of interest produced via respective first and second molecular imaging modality and extract a set of parameters associated with each modality. In accordance with an aspect of the present invention, the first and second image modalities may have a significant difference in their spatial resolution. While the method can be used with a broad range of differences in resolution, the inventors have found excellent results where the resolutions differ by a factor of between one and fifteen. Accordingly, the first feature extractor 12 may extract a set of parameters for each of a first set of locations within the region of interest, with each location representing a sampling location or pixel within the image, and the second feature extractor 14 may extract a set of predictors for each of a second, different set of parameters. It will be appreciated, however, that in each case less than all of the pixels or sampling locations associated with a given image can be included in the set of locations for the associated imaging modality.

In some implementations, the feature extractors 12 and 14 can simply extract the parameters produced by the imaging models at a sampling location or pixel and various linear and non-linear functions of these parameters. In general, however, the native form in which a source modality delivers measurements is not necessarily ideal for the efficient capture of cross-modality relationships. It is often preferable to transform the observations to a data space that brings out interesting patterns more clearly, while removing variables that add little information. If a source modality delivers many variables, particularly with a strong correlation among them, the transformation can entail some form of dimensionality reduction or similar feature reduction, for example, selecting among the spectral peaks provided in imaging mass spectrometry (IMS). If a source modality delivers few variables, the transformation can focus on increasing the number of relevant variables by mining the observations for additional insights, for example, via textural analysis of microscopy images.

A mapping component 16 is configured to associate each of the first set of locations to at least one of the second set of locations. Effectively, the mapping component 16 explicitly links the two sets of extracted features to each other to generate a set of examples on which to train the cross-modality model. Each example includes a first set of parameters associated with the first imaging modality and a second set of parameters associated with the second imaging modality. Such a mapping can be provided to some extent by an image registration transformation between the two modalities using a combination of spatial domain, spectral domain, and sample-specific cues. In accordance with an aspect of the present invention, however, the mapping component 16 can use knowledge associated with a given modality to weigh the links between locations according to modality-specific models for how an observation ties to the surface area represented by its pixel. The end result of this process is a set of weighted links between the measurements and their derived parameters coming from the different data sources. Using these links, the system implicitly defines a data set of instances for which measurements in both modalities are available, regardless of the spatial resolution at which they were acquired.

For example, the mass spectrum tied to an IMS pixel typically does not characterize the entire rectangular tissue region defined by the pixel. Instead the signal is characterizing the tissue material that is actually ablated by the laser, which is usually only a subarea of the theoretical pixel surface. This means that any microscopy pixels characterizing the sides of the IMS pixel might not be tied to the IMS measurement at all, or if they do, arguably would have a lesser contribution than the microscopy pixels in the middle where the main impact of the laser is. In this example, the IMS laser ablation can be represented as a two-dimensional Gaussian model, such that most microscopy observations on the outside of the region will receive little or no weight, and while microscopy observations towards the center of the IMS pixel will have higher weights, with the weight of the microscopy observations increasing in concentric rings. In other implementations, the laser footprint in matrix-assisted laser desorption/ionization (MALDI) based imaging mass spectrometry or the sampling footprint in desorption electrospray ionization (DESI) based imaging mass spectrometry can be used with a theoretical or empirically determined characterization of sample ablation used to weigh the links between measurements in a non-uniform way.

In general, the mapping component 16 can exploit prior instrumental knowledge specific to a given molecular imaging modality to further refine the training set, and improve the quality of the cross-modality model and its predictions. The weights assigned to each location can be represented in a number of ways. In one example, the weights could be applied by modifying the content of the observations, for example, by scaling the intensities. In another implementation, examples having larger weights are entered multiple times into the training set, with a frequency corresponding to the weights. This removes the need to interpret the contents of observations, and allows the training couples with zero weight to be removed from the training set entirely.

The training set of examples produced at the mapping component 16 are provided to a modeling component 18 which constructs a mathematical model relating parameters from the first image to one or more corresponding parameters from the second image. It will be appreciated that additional predictors can be provided for the model, for example, from a third imaging modality or a medical atlas. Effectively, the modeling component mines the training set for any detectable relationships between observations in the first imaging modality and observations in the second imaging modality. The model captures these relationships as mathematical descriptions, such that observations in one molecular imaging modality model can be used to predict observations in a second imaging modality. Example implementations can include but are not limited to partial least squares regression and factorization methods. The type of model can be adjusted to incorporate domain-specific knowledge, such as the Poisson distribution nature of ion counts in mass spectrometry.

In one implementation, the modeling component 18 models each of a plurality of parameters associated with the second imaging modality as a linear combination of the parameters associated with the first imaging modality. Specifically, partial least squares regression can be used to identify cross-modality relationships. It will be appreciated, however, that non-linear models may also be used to capture more complex relationships between the imaging modalities. The inventors have found that linear modeling of parameters in this manner is sufficiently complex to capture structure hidden in the variation across different modalities. Further, a linear model allows straightforward interpretation of the relationships between variables. Finally, it will be appreciated that a partial least squares regression approach can efficiently handle data sources where the number of observations is less than the number of variables measured per observation, which is common in molecular imaging applications. Most imaging modalities from other fields measure fewer variables than they acquire pixels, although it will be appreciated that the systems and methods described herein could be utilized with these modalities as well.

The modeling component 18 also evaluates the determined mathematical relationships to determine a confidence in the predictive value for each of the plurality of modeled parameters. It will be appreciated that the model can be evaluated via comparison of the predicted results to known results (e.g., in a test or validation set), via bootstrapping methods, or any other appropriate method. In one implementation, in addition to cross-validation and the generation of confidence intervals through techniques such as bootstrapping, the system can perform a round-trip prediction to assess model performance for each variables in a given modality separately. This entails that the system uses only variables from one modality together with the calculated cross-modality model to predict each variable of the other modality, and vice versa. The comparison of these predicted values to their measured values identifies which variables on both sides are involved in patterns that have a multi-modality support base, and discerns which variables have most cross-modality predictive potential. Only parameters for which the performance of the model exceeds a certain threshold will be predicted via the model when the model is applied.

The determined model and the image data are provided to a post-processing component 20 that processes the image data to represent the modeled relationships in a human comprehensible form at an associated display 22. For example, ties between variables measured by different physical measurement principles can be displayed as a series of regression weights for the predictor parameters for each of a plurality of predicted parameters, representing a set of potential biological or instrumental relationships between the techniques that can be exploited for directed analyses. Similarly, by identifying patterns that have a corroborating support base across different imaging modalities from modality-specific patterns, the patterns themselves can be denoised via removal of single-modality patterns. Similarly, multiple molecular imaging can be fused into a single aggregating modality that combines the different advantages of its member modalities. Independent of image fusion applications, measurements via another modality can be used with the cross-modality model to predict observations for a modality for which making physical measurements is unpractical (e.g., due to acquisition time), uneconomical (e.g., due to acquisition cost), unethical (e.g., a destructive measuring method in human subjects), or unfeasible (e.g., due to low SNR). Finally, ties between variables measured by different physical measurement principles can be discovered via review of the mathematical model, delivering a set of potential biological or instrumental relationships between the techniques that can be exploited for directed analyses.

Figure 2:
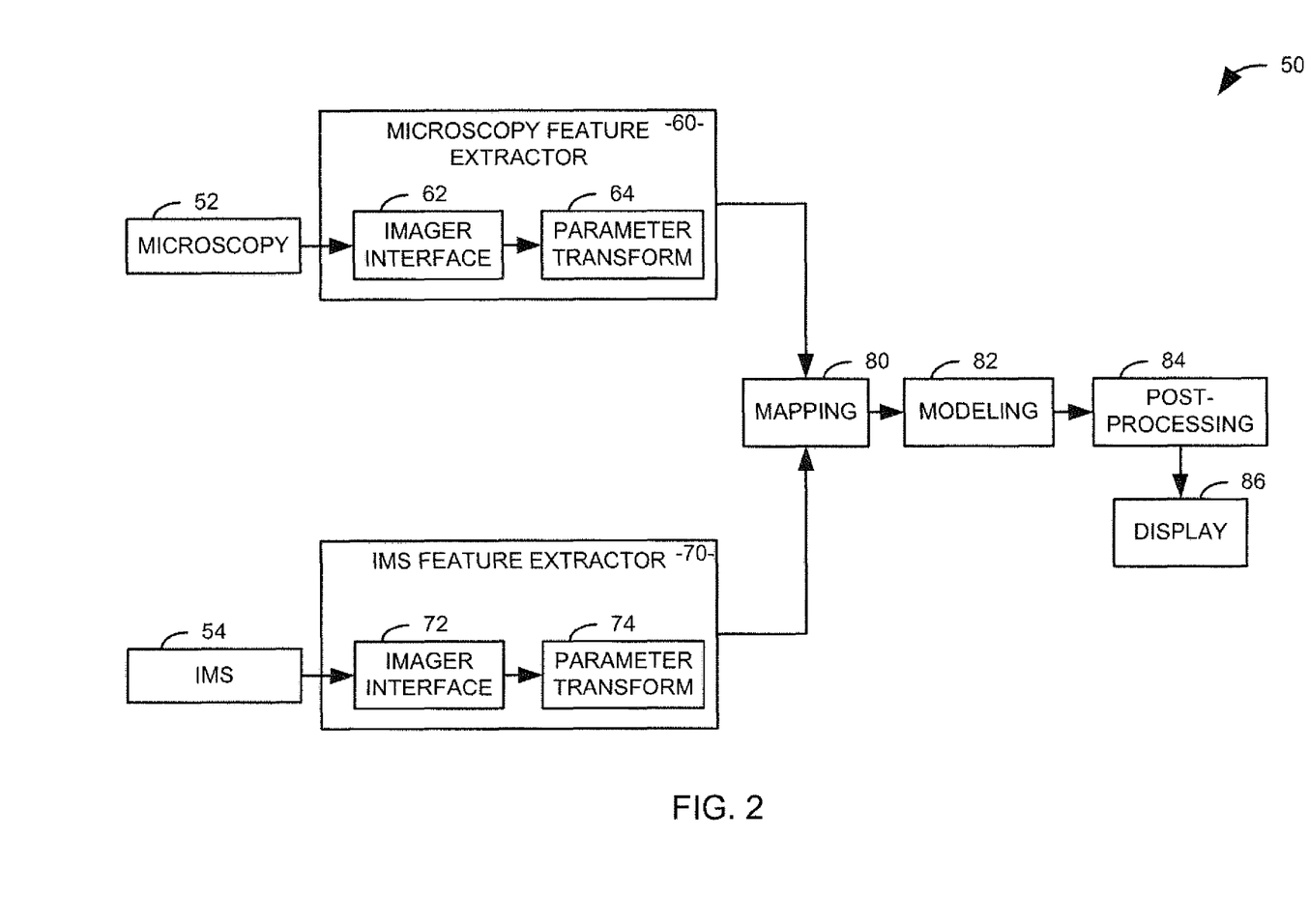
FIG. 2 illustrates one example of system for identifying relationships among multiple molecular imaging modalities in accordance with an aspect of the present invention.

FIG. 2 illustrates one example of system 50 for identifying relationships among multiple molecular imaging modalities in accordance with an aspect of the present invention. In the illustrated example, the system 50 combines data from a microscopy apparatus 52 and an imaging mass spectrometer (IMS) system 54 in an image sharpening application to provide a mass-spectrometer image with the superior spatial resolution of the microscopy system.

An image from the microscopy apparatus 52 is provided to a microscopy feature extractor 60. The microscopy feature extractor 60 includes a first imager interface 62 that determines a set of parameters associated with each pixel, specifically the red, green, and blue chromatic intensity values for each pixel. A first parameter transform component 64 calculates at least one additional parameter for each pixel from the red, green, and blue values to capture additional information from the microscopy image. For example, the additional parameters can include one or more texture components calculated from the red, green, and blue chromatic intensity values of a given pixel and neighboring pixels.

The inventors have found that the cross-modality model works best when member modalities are as rich as possible in data variation, but this is not restricted to human-observable variation. Most microscopy modalities and protocols try to maximize the contrast in the picture with an eye towards maximizing human visual discernment, but in the illustrated system 50, image capture should be optimized not towards human consumption, but rather to maximize the information and nuances a computer can recognize. The system 50 responds well to increased biology-driven variation in the data sources, with de-noising and removal of instrumental and technical variation where possible. Further, the parameter transform component 64 can be configured to extract as many informative variables from the sources as are reasonable and can fit within the available computational resources to maximize the likelihood that a useful relationship between the microscopy parameters and the IMS measurements will be determined.

An image from the IMS system 54 is provided to an IMS feature extractor 70. The IMS feature extractor 70 includes a second imager interface 72 that determines a set of parameters associated with each sampled location in the IMS image, specifically the spectral peaks associated with each location. A second parameter transform component 74 reduces the number of parameters associated with each location. In one implementation, a predetermined number of peaks known to be of interest can be selected from the various locations. In another implementation, a principle components analysis (PCA) or similar dimensionality reduction algorithm can be applied. It will be appreciated that it is not necessary to use the same tissue section for both modalities, but using the same section reduces the number of morphological discrepancies and increases the quality of the resulting model and predictions.

Once appropriate sets of parameters have been determined for the locations in each molecular imaging modality, the images are provided to a mapping component 80. The mapping component 80 is configured to register the two images, for example, using fiduciaries or natural landmarks, and then match a first set of locations from the spectrometer to the second set of locations from the IMS to generate a training set for a cross-modality model. Specifically, each measurement on the IMS side is matched to a variable number, M, pixels on the microscopy side. M is zero for areas where there is no overlap between the IMS acquisition area and the microscopy acquisition area. M is one if there is overlap and the spatial resolution of the microscopy matches that of the IMS experiment.

In most cases, however, M is larger than one as the difference in resolution means that many microscopy pixels end up characterizing the same surface area as a single IMS measurement. This one-to-many pixel mapping from the modality with the coarsest resolution to the modality with the finest resolution can be dealt with in two ways. One way is to collapse the observations of the high-resolution modality down to a single consensus observation that hopefully captures the intricacies of its member observations adequately, and thus add a single example to the training set for each lower-resolution observation. There are many ways this could be accomplished, such as taking the average or median intensities for each band or picking only the values of the central microscopy pixel. Where a consensus method is used, the representative value should be carefully selected to avoid generating consensus observations that are never encountered among the real microscopy, as the alternative might mean the model gets trained on nonsensical observations, which it will never encounter during the sharpening process.

In the illustrated implementation, the mapping component 80 enters an example into a training set for each of the high-resolution observations and to re-use the lower-resolution observation each time. Although re-using an IMS observation multiple times for different microscopy observations may seem counter-intuitive and may appear to risk overfitting the model, the inventors have determined that producing multiple observations in this manner provides a significant increase in accuracy and allows for domain specific knowledge about a given imaging modality, such as IMS, to be incorporated into generation of the training set. Further, since the IMS measurement typically ablates a surface area bigger than a single microscopy pixel, the IMS observation represents an area that is actually a mixture of many microscopy observations. It is therefore beneficial to show the model examples of all the microscopy signatures that could lead to that IMS observation. The use of multiple training samples from each IMS location also renders the mapping less sensitive to spatial errors in the registration of the IMS image to the microscopy image.

Another advantage of reusing IMS observations allows for seeding the training set with examples that reflect the IMS pixel's 'region-of-influence', particularly when this reuse can be weighted to account for known properties of the IMS ablation. Adding multiple examples for each IMS measurement can result in undesirable examples ending up in the training set, much like those introduced by outlier measurements or differences between subsequent tissue sections. However, the effect of such localized false positive training examples will in most cases be mitigated by the sheer number of training examples supplied over the entire tissue section, which in the illustrated implementation, measures in the millions. The inventors have achieved good results generating lots of training examples and allowing the model to generalize the important trends from the noise. Similar microscopy pixels under the same IMS pixel will re-enforce their connection to this IMS observation, such that the influence of outlier microscopy pixels on the final model is reduced.

The generated training set is then provided to a modeling component 82 that generates a mathematic model relating the microscopy measurements to one or more selected peaks in the IMS. It will be appreciated that the model can utilize any appropriate supervised learning algorithm, but in the illustrated implementation, the building of a model is approached as a regression problem. Specifically, a regression analysis is used to understand how the ion intensity of a particular ion species changes when the values of one or more microscopy variables change. The analysis provides for each IMS variable or ion image a regression function, which describes the intensity and distribution of that ion as a function of the intensity distributions of a subset of the microscopy variables. The final cross-modality model consists of the combined regression functions, and enables concurrent prediction for all ion images (or IMS variables) when presented with a microscopy observation.

The modeling component attempts to approximate each ion image as a combination of microscopy-derived patterns. It will be appreciated that regression analysis comprises a wide assortment of methods to choose from, tailored towards various data types and constraints (e.g., linear vs. non-linear, parametric vs. non-parametric). The choice of regression method, method parameters, and model type will vary with the application and available processing resources, and the relationships discovered by the modeling can vary with the approach used. For example, if the distribution and intensity of a variable in one modality shows a quadratic or logarithmic relationship to the expression of a variable in another modality, a linear modeling approach will have a hard time capturing that relationship adequately and will often result in only partial approximation in a subset of these variables' ranges. The resulting model is not a single curve, but rather a set of slopes and intercepts that, when fed a microscopy measurement, outputs a prediction for the IMS variables. In the illustrated implementation, a partial least squares regression is used, which the inventors have found to be successful in capturing a significant amount of cross-modality interaction between microscopy and IMS. Further, partial least squares regression is robust against collinear predictors. This characteristic is often present in multi-modal data sets in the illustrated systems since the transformations 64 and 74 do not specifically pursue orthogonal variables and, for example, many microscopy variables are often texture filtered versions of others.

At a high level, cross-modality modeling is a matter of dividing a measurement into two parts, which, when summed, produce the original measurement, specifically a cross-modality part that can be described as a combination of patterns from another modality and a modality-specific part that does not yield accurate description using the other modality. If there is a strong cross-modality relationship for this measurement, most of its variance will end up in the cross-modality part, with mostly modality-specific noise remaining in the modality-specific part. In this case, good cross-modality prediction is possible. If the model does not succeed in capturing a strong cross-modality relationship, either because there is no detectable relationship or the relationship structure cannot be well described by the used model type, the majority of the measurement will end up in the modality-specific part. In this case, good cross-modality prediction is not an option. This can happen, for example, when the measurement traces a biological pattern that is unique to only one of the two modalities. In practice, however, many measurements are well-suited for cross-modality modeling due to histological commonalities in the tissue. Protein imaging applications, for example, appear to yield particularly good results when paired with hemotoxylin and eosin (H&E) microscopy.

In one implementation, the predicted IMS image for each ion can be compared to the actual image to determine if the microscopy data relates to the measured values for that ion. For some ions, the best microscopy-based approximation at IMS resolution may be found to be far removed from the measured ion image, indicating that the used microscopy pattern vocabulary does not contain the tissue patterns relevant to that ion. For these ions, the connection to the microscopy is insufficiently strong to use microscopy as a guide towards deeper insights through fusion and prediction. However, due to biological and structural commonalities in the samples leading up to the two types of measurements, there usually are ions for which the microscopy-based approximation does match the ion distribution well. In these cases, the strong link to microscopy-reported tissue patterns can be leveraged for prediction purposes, and cross-modality integration of the two data types becomes feasible. Since the cross-modality model attempts to describe each ion image as a function of microscopy patterns, retaining only the best performing combination for each ion given the structure of the model and the pattern vocabulary given and only the strongest of these relationships are used for prediction, these predictions have a tendency to enrich for variation that is supported by both modalities, and to attenuate modality-specific variation.

In another implementation, prediction performance can be calculated using reconstruction scores, for example, calculating the remaining structure in the modality-specific pattern using a spatial autocorrelation measure such as Moran's I. An absolute reconstruction score captures how closely the absolute intensity values of the measurements are approximated. This score incorporates a spatial autocorrelation factor so randomly distributed noise gets attenuated accordingly from participating in this score. A relative reconstruction score captures how well the relative spatial pattern is represented, regardless of whether the right ion intensities are returned. An overall reconstruction score is the mean of these two values. A threshold value for the reconstruction scores can be defined with any predicted image exceeding the threshold score considered to be a reasonable reconstruction worthy of further assessment. If the prediction error is available, it can be determined whether the prediction error is good in the area of interest. In general, the overall reconstruction score is used, as a high overall reconstruction score indicates that both the relative pattern and the peak intensities were predicted well. However, for applications in which the primarily concern is the physical location of an ion in the tissue rather than estimating its abundance correctly, it is possible to assess the prediction purely on their relative pattern reconstruction score, and to build a ranking on that score alone, while disregarding the absolute intensity score.

Once the model has been established, the model and both images can be provided to a post-processing element 84. The post-processing element 84 utilizes the generated model and at least a microscopy image to replace or enhance a corresponding IMS image. IMS is particularly well-suited for image fusion application as it is a very information-rich modality, which concurrently maps the spatial distributions of hundreds of biomolecules throughout an organic tissue section. IMS is much richer in chemical information than microscopy, which has low chemical specificity, but the sub-micron resolutions of microscopy outperform the tens to hundreds of micrometers in pixel width typically achieved via matrix assisted laser desorption/ionization (MALDI) based IMS. If the variation of IMS and microscopy measurements exhibits structural correspondences and these structural correspondences can be harnessed in a mathematical model, it becomes possible to predict at least some IMS data on the basis of microscopy measurements. Since microscopy measurements are available at a higher spatial resolution than IMS measurements, it even becomes possible to predict IMS values at spatial resolutions that exceed the measurement resolution of the IMS data, on the condition that the modeled relationships hold at those predicted resolutions.

Accordingly, in one application the post-processing element 84 can perform ion image sharpening. In ion image sharpening, the function of microscopy variables that gives a good approximation of an ion's distribution at the IMS resolution is also trusted to hold true at finer scales up to the microscopy resolution. The higher-resolution ion image prediction is obtained by employing the same model of microscopy variables, but now feeding them at a resolution closer to their native microscopy resolution. Whether it is valid to use the model at a higher spatial resolution depends on the requested up-sampling factor and various data source parameters, but the inventors have shown that for microscopy and IMS that, given a careful choice of up-sampling factor, it is possible to provide a predicted response identical to an actual measurement at that resolution. The inventors have had significant success with up-sampling factors of one up to fifteen in cross-modality applications for microscopy and IMS.

It is important to note that the model is not built at one specific spatial resolution. The microscopy data is not down-sampled to fit the lower spatial resolution of IMS for the model building phase, and through the mapping and weighting system tissue features described at finer resolutions influence the model building process in proportion to their surface area, ablation area contribution, and signal strength, determined via known properties of the IMS imager. This allows the model building phase to generalize across several scales between the IMS and microscopy resolution, avoids human-introduced bias regarding tissue feature importance, makes the model robust against imperfect registration or sequential tissue differences, and in general allows the modeling algorithm to determine whether tissue features are influential enough to merit being captured by the model.

In another implementation, the determined model can be used for denoising the images. As tissue structure and biological content will have a chance to modulate the measurements in both technologies and technology-specific noise sources are unlikely to find a connection to measurements in the other technology, cross-modality integration can be used to remove modality-specific patterns, often noise, from the images. Although modality-specific variation can be biological in nature, measured variables dominated by such variation will not be allowed to progress to cross-modality prediction in the first place, which means that for those variables that are considered for prediction the removal effect will always be relatively minor compared to the overall pattern. In fact, the removal of modality-specific variation from predicted patterns is constrained to a user-defined percentage via the evaluation performance cut-off, while the option for evaluation at other thresholds remains available without rebuilding the model.

In denoising, the predictive capabilities of the cross-modality model are not used to increase the resolution of the ion images. Instead, the prediction is kept at the same resolution as the measured ion images. While actual IMS measurements are available at the lower resolution, the predictions are not identical to the measurements—they are a fusion of IMS and microscopy information. As such, these predictions will have a tendency to enrich for patterns that are supported by both modalities and to attenuate patterns that are modality-specific. The opportunity lies in the fact that technology-specific noise will usually not have a counterpart in the other technologies' observations, and thus will tend to end up in the modality-specific patterns, which are attenuated in the predictions. At the same time, biological patterns can leave a trace in both modalities, as they are physically present at both acquisitions. Patterns that are corroborated across technologies, often but not always biological in nature, will be emphasized in the predictions.

In yet another implementation, the training set and model building are restricted to only a subregion of the region of interest, and the microscopy image and the model are used to predict ion intensity values outside of the subregion. And findings in the model itself can be used to determine which variables in one modality are most informative on a variable of interest in the other modality, allowing for a cheaper or more practical estimate of that variable of interest or a way for corroboration or outlier detection for the variable of interest via independent instrumentation. More generally, since the regression analysis is a transparent "white-box" prediction model, each model can provide insight into the shape and form of cross-modality relationships. It will be appreciated that, while the example of FIG. 2 uses a linear model, regression analysis also enables probing measurements for possible linear and nonlinear (e.g., quadratic, polynomial) cross-technology connections. This could provide an empirically-driven and bottom-up way for discovery of synergetic relationships between different technologies and sensor types, but also between different wet-lab protocols using the same sensor type, and even between different time points using the same technology and preparation.

Figure 3:
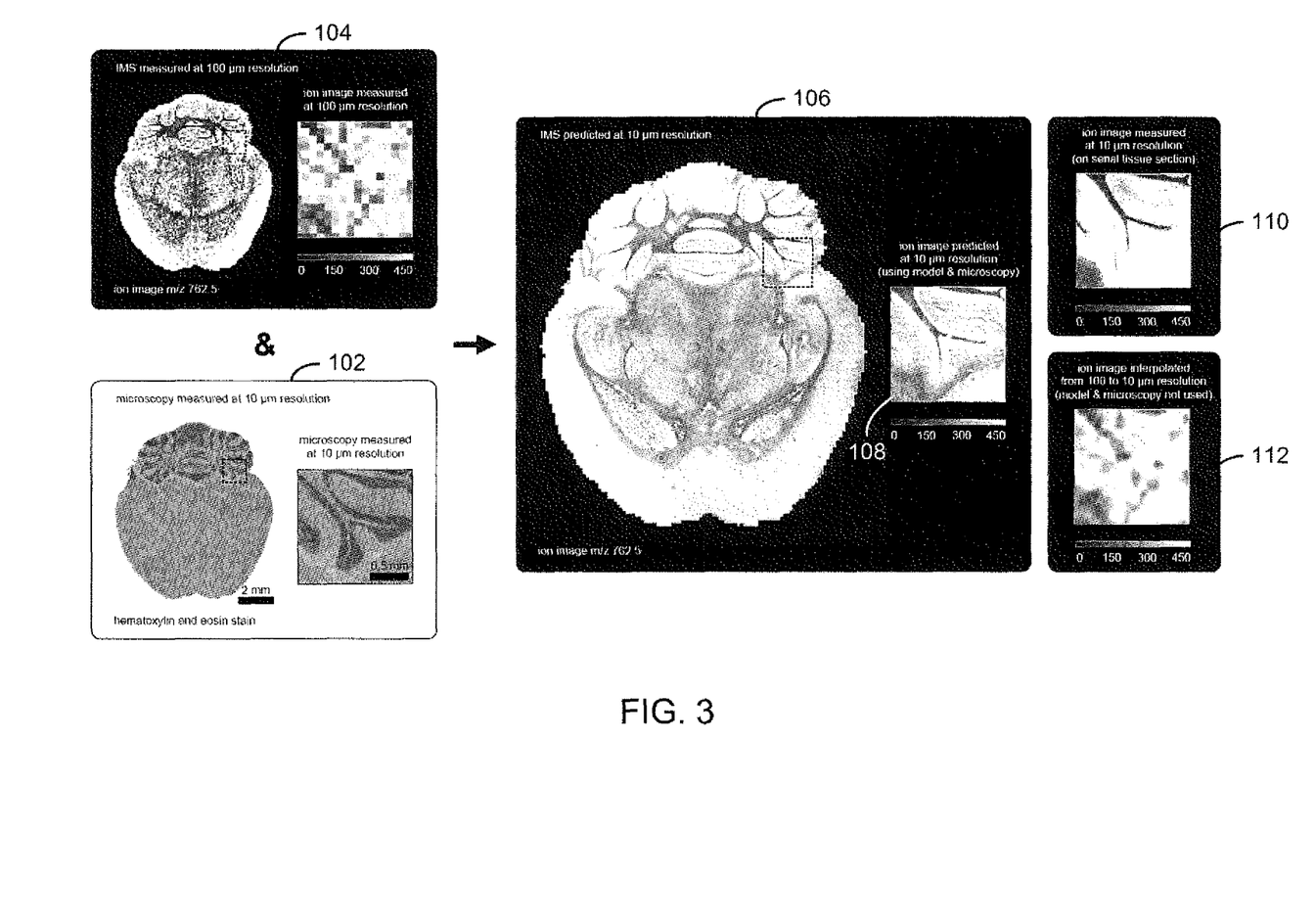
FIG. 3 illustrates one example of an prediction application in accordance with an aspect of the present invention

FIG. 3 illustrates one example of a prediction application in accordance with an aspect of the present invention. In this application, a microscopy image 102 of tissue prepared with a hemotoxylin and eosin stain is generated at a spatial resolution of ten micrometers and submitted to feature extraction to produce a plurality of predictors, both native and derived, for each of a plurality of pixels within the image. An ion image 104, representing the intensity of m/z 762.5, is generated at a spatial resolution of one hundred micrometers as part of an imaging mass spectrometry procedure.

From the predictors derived from each pixel of the microscopy image 102 and corresponding intensity values within the ion image 104, a training set is built for a regression model representing relationships between the microscopy parameters and the ion intensity. It will be appreciated that both of a set of predictors associated with a given pixel and an ion intensity value associated with a given location in the ion image can be repeated within the training set, and, in fact, multiple identical training samples may be included to add weight to a given observation. Once the model is trained, the ion intensity at a given location can be represented as a linear function of the predictors for that location. From this model and the predictor values from the microscopy image 102, an image 106 representing the predictions for the ion intensity can be generated at the ten micrometer resolution of the microscopy image.

In accordance with an aspect of the present invention, the generated model can be used to make predictions for tissue outside of the region used for training. To this end, a prediction of the ion values for a serial tissue slice, proximate to the region used for training, is illustrated as an image 108. It will be appreciated that the illustrated prediction 108 is generated from a microscopy image taken at a resolution of ten micrometers and the predictive model. An ion image 110 for m/z 762.5 for the serial slice taken at ten micrometers is provided for comparison. It will be appreciated that the prediction provides a reasonable approximation of the measured image, and due to the denoising effect of the cross-modality model, likely omits much of the noise present in the measured slice. An approximation 112 of a ten micrometer ion image of the original tissue section, interpolated from a measurement of the ion image at a resolution at one hundred micrometers is also provided for comparison. ft will be appreciated that the predicted value 108 is considerably clearer and appears to match the measured high resolution ion image 110 much more closely.

Figure 4:
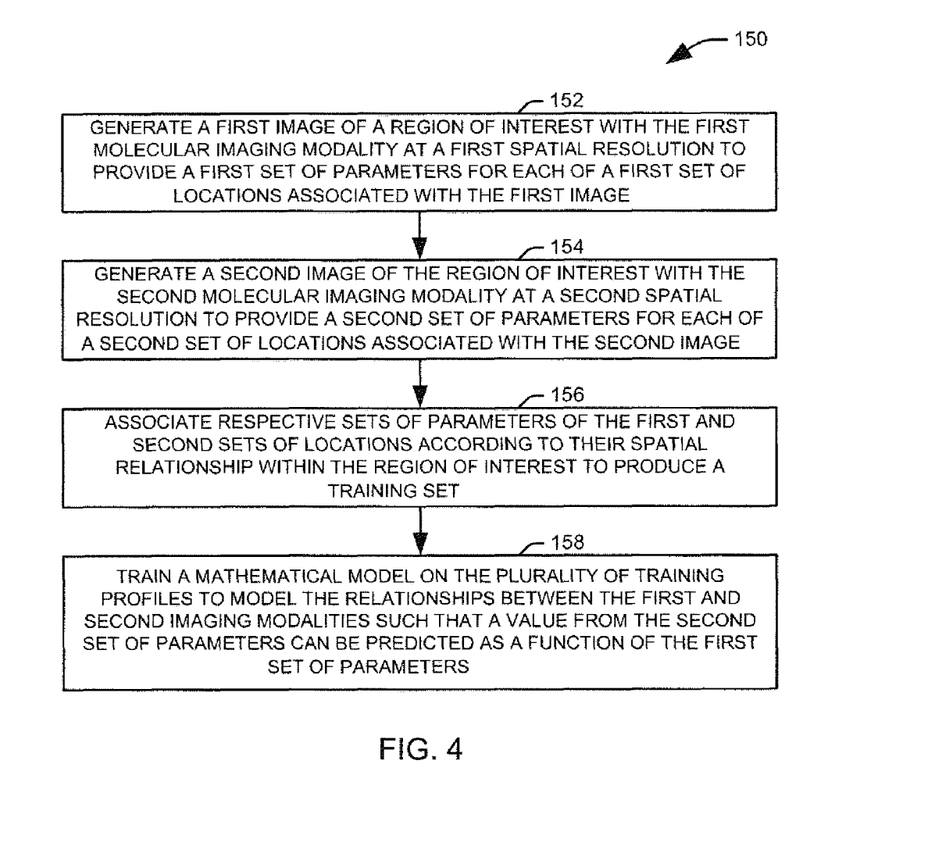
FIG. 4 illustrates a method for modeling relationships between an output of a first molecular imaging modality and an output produced by a second molecular imaging modality in accordance with an aspect of the present invention.

In view of the foregoing structural and functional features described above in FIGS. 1-3, example methodologies will be better appreciated with reference to FIG. 4. While, for purposes of simplicity of explanation, the methodology of FIG. 4 is shown and described as executing serially, it is to be understood and appreciated that the present invention is not limited by the illustrated order, as some actions could in other examples occur in different orders and/or concurrently from that shown and described herein.

FIG. 4 illustrates a method 150 for modeling relationships between an output of a first molecular imaging modality and an output produced by a second molecular imaging modality in accordance with an aspect of the present invention. At 152, a first image of a region of interest is generated with the first molecular imaging modality at a first spatial resolution to provide a first set of parameters for each of a first set of locations associated with the first image. For example, the first image can be provided via a microscopy technique. At 154, a second image of the region of interest is generated with the second molecular imaging modality at a second spatial resolution to provide a second set of parameters for each of a second set of locations associated with the second image. The second spatial resolution being different from the first spatial resolution. For example, the second image can be provided via an imaging mass spectrometry technique.

At 156, respective sets of parameters of the first and second sets of locations are associated according to their spatial relationship within the region of interest to produce a training set. Each example in the training set comprises a set of parameters associated with a location in the first set of locations and a set of parameters associated with a location in the second set of locations. In one implementation, a plural subset of the first set of locations is associated with each of the second set of locations. The set of parameters associated with each of the plural subset of the first set of locations can be weighted according to known properties of the second imaging modality, such that the training set includes multiple examples having the set of parameters associated with the given location in the plural subset and the set of parameters associated with the given location in the second set of locations. The number of repeats for a unique pairing of parameters thus varies with the weight assigned to each location in the plural subset of the first set of locations.

At 158, a mathematical model is trained on the plurality of training profiles to model the relationships between the first and second imaging modalities such that a value from the second set of parameters can be predicted as a function of the first set of parameters. For example, the mathematical model is generated via a partial least squares regression analysis. In one implantation, the training of the model can include determining a confidence value for each of the second set of parameters representing an expected accuracy with which the second set of parameters can be predicted given the first set of parameters. This can be accomplished, for example, via bootstrapping methods or comparison of prediction of a test set to known values.

Figure 5:
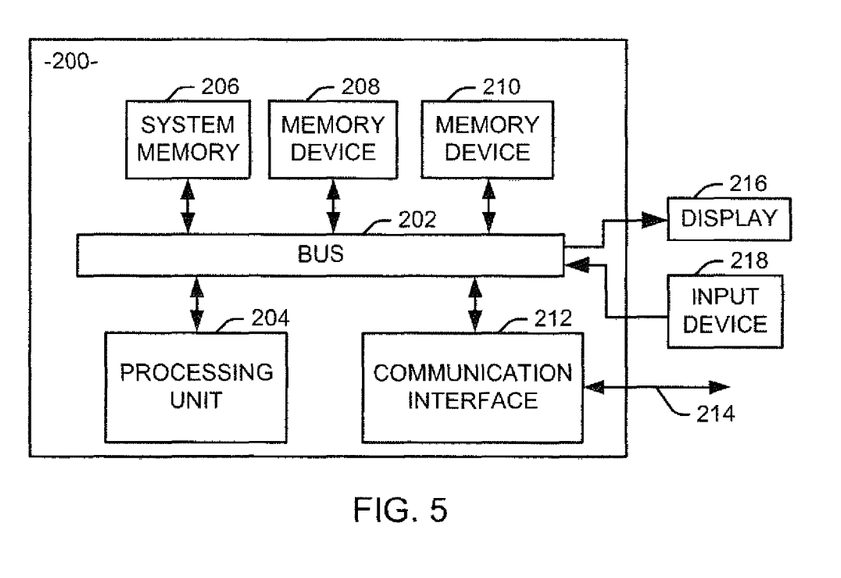
FIG. 5 is a schematic block diagram illustrating an exemplary system of hardware components.

FIG. 5 is a schematic block diagram illustrating an exemplary system 200 of hardware components capable of implementing examples of the systems and methods disclosed in FIGS. 1-4, such as the cross-modality modeling system illustrated in FIGS. 1 and 2. The system 200 can include various systems and subsystems. The system 200 can be a personal computer, a laptop computer, a workstation, a computer system, an appliance, an application-specific integrated circuit (ASIC), a server, a server blade center, a server farm, etc.

The system 200 can includes a system bus 202, a processing unit 204, a system memory 206, memory devices 208 and 210, a communication interface 212 (e.g., a network interface), a communication link 214, a display 216 (e.g., a video screen), and an input device 218 (e.g., a keyboard and/or a mouse). The system bus 202 can be in communication with the processing unit 204 and the system memory 206. The additional memory devices 208 and 210, such as a hard disk drive, server, stand alone database, or other non-volatile memory, can also be in communication with the system bus 202. The system bus 202 interconnects the processing unit 204, the memory devices 206-210, the communication interface 212, the display 216, and the input device 218. In some examples, the system bus 202 also interconnects an additional port (not shown), such as a universal serial bus (USB) port.

The processing unit 204 can be a computing device and can include an application-specific integrated circuit (ASIC). The processing unit 204 executes a set of instructions to implement the operations of examples disclosed herein. The processing unit can include a processing core.

The additional memory devices 206, 208 and 210 can store data, programs, instructions, database queries in text or compiled form, and any other information that can be needed to operate a computer. The memories 206, 208 and 210 can be implemented as computer-readable media (integrated or removable) such as a memory card, disk drive, compact disk (CD), or server accessible over a network. In certain examples, the memories 206, 208 and 210 can comprise text, images, video, and/or audio, portions of which can be available in formats comprehensible to human beings.

Additionally or alternatively, the system 200 can access an external data source or query source through the communication interface 212, which can communicate with the system bus 202 and the communication link 214.

In operation, the system 200 can be used to implement one or more parts of a cross-modality imaging system in accordance with the present invention. Computer executable logic for implementing the composite applications testing system resides on one or more of the system memory 206, and the memory devices 208, 210 in accordance with certain examples. The processing unit 204 executes one or more computer executable instructions originating from the system memory 206 and the memory devices 208 and 210. The term "computer readable medium" as used herein refers to a medium that participates in providing instructions to the processing unit 204 for execution.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. A system for generating a model relating parameters generated via a first molecular imaging modality to parameters generated via a second molecular imaging modality, the system comprising:
   a first feature extractor configured to extract, from a first image of a region of interest obtained via the first molecular imaging modality, a set of parameters for each of a first set of locations associated with the first image;
   a second feature extractor configured to extract, from a second image of a region of interest obtained via the second molecular imaging modality, a set of parameters for each of a second set of locations associated with the second image;
   a spatial registration component configured to associate respective locations of the first and second sets of locations according to their spatial relationship within the region of interest to produce a training set, wherein each example in the training set comprises a set of parameters associated with a location in the first set of locations and a set of parameters associated with a location in the second set of locations; and
   a modeling component configured to generate a predictive model relating the parameters associated with the first molecular imaging modality with at least one parameter associated with the second molecular imaging modality.

2. The system of claim 1, wherein the image registration component is configured to match a plural subset of the first set of locations to each of the second set of locations, such that the training set includes a plurality of examples comprising the set of parameters associated with a given location of the second set of locations.

3. The system of claim 2, wherein the contribution of the set of parameters associated with each of the plural subset of the first set of locations to the training set is weighted according to known properties of the second imaging modality, such that the weight assigned for a first set of parameters, representing a first location of the plural subset of the first set of locations, is different from the weight assigned to a second set of parameters, representing a second location of the plural subset of the first set of locations.

4. The system of claim 3, wherein the weight assigned to a given location in the plural subset of the first set of locations is represented as a number of examples in the training set comprising the set of parameters associated with the given location in the plural subset of the first set of locations and the set of parameters associated with the given location in the second set of locations.

5. The system of claim 1, wherein the first molecular imaging modality is a microscopy technique and the second molecular imaging modality is a mass spectrometry technique.

6. The system of claim 1, wherein the first feature extractor is configured to extract, for each of a first set of locations associated with the first image, a first subset of parameters comprising parameters native to the first molecular imaging modality and a second subset of at least one parameter that is derived from the first subset of predictors.

7. The system of claim 6, wherein the first subset of parameters includes at least a chromatic intensity value and the second subset of parameters includes at least one value representing image texture at each of the first set of locations.

8. The system of claim 6, wherein at least one of the second subset of parameters is a nonlinear function of a corresponding one of the first subset of parameters.

9. The system of claim 1, wherein the modeling component is configured to generate the predictive model via a multivariate regression analysis.

10. The system of claim 9, wherein the modeling component is configured to generate the predictive model via a nonlinear multivariate regression analysis.

11. A method for modeling relationships between an output of a first molecular imaging modality and an output produced by a second molecular imaging modality, the method comprising:
    generating a first image of a region of interest with the first molecular imaging modality at a first spatial resolution to provide a first set of parameters for each of a first set of locations associated with the first image;
    generating a second image of the region of interest with the second molecular imaging modality at a second spatial resolution to provide a second set of parameters for each of a second set of locations associated with the second image, the second spatial resolution being different from the first spatial resolution;
    associating respective sets of parameters of the first and second sets of locations according to their spatial relationship within the region of interest to produce a training set, wherein each example in the training set comprises a set of parameters associated with a location in the first set of locations and a set of parameters associated with a location in the second set of locations; and
    training a model on the plurality of training profiles to model the relationships between the first and second imaging modalities such that a value from the second set of parameters can be predicted as a function of the first set of parameters.

12. The method of claim 11, the method further comprising determining a confidence value for each of the second set of parameters representing an expected accuracy with which the second set of parameters can be predicted given the first set of parameters, the method further comprising removing any parameters of the second set of parameters having a confidence value below a threshold.

13. The method of claim 11, wherein associating respective sets of parameters of the first and second sets of locations according to their spatial relationship comprises matching a plural subset of the first set of locations to each of the second set of locations, the set of parameters associated with each of the plural subset of the first set of locations to the training set being weighted according to known properties of the second imaging modality, such that a number of examples in the training set comprising the set of parameters associated with the given location in the plural subset of the first set of locations and the set of parameters associated with the given location in the second set of locations varies with a weight assigned to each location in the plural subset of the first set of locations.

14. The method of claim 11 wherein the first molecular imaging modality is a microscopy technique and the second molecular imaging modality is a mass spectrometry technique.

15. The method of claim 11, further comprising determining a relationship between at least one parameter associated with the first imaging modality and at least one parameter associated with the second imaging modality from the trained model.

16. The method of claim 11, wherein training the model on the plurality of training profiles comprises training the model via a multivariate regression analysis.

17. The method of claim 16, wherein training the model on the plurality of training profiles comprises training the model via a partial least squares regression analysis.

18. The method of claim 11, wherein the region of interest is a first region of interest, the method further comprising:
   generating an third image of a second region of interest generated with the first molecular imaging modality to provide the first set of parameters for each of a third set of locations associated with the third image; and
   predicting, at a subset of the third set of locations, values for at least one of the second set of parameters from the trained model as a function of the first set of parameters at each of the subset of locations.

19. The method of claim 11, wherein the training set is produced from a subset of the first set of locations associated with a subregion of the first image, the method further comprising predicting at least one of the second set of parameters from the trained model as a function of the first set of parameters at each of the first set of locations that is not a member of the subset.

20. A non-transitory computer readable medium storing machine executable instructions for predicting, from a microscopy image of a region of interest, an output of a imaging mass spectrometry (IMS) scan of the region of interest, the machine executable instructions comprising:
   a feature extractor configured to receive the microscopy image and extract a set of predictors for a plurality of pixels of the microscopy image;
   a predictive model configured to calculate a predicted output value for at least one IMS parameter for each of a plurality of locations within the region of interest according to the extracted sets of predictors; and
   a post-processing component configured to represent the predicted output values in a human comprehensible form for display at an associated display.

* * * * *

UNITED STATES PATENT AND TRADEMARK OFFICE
CERTIFICATE OF CORRECTION

PATENT NO. : 9,501,687 B2
APPLICATION NO. : 14/402909
DATED : November 22, 2016
INVENTOR(S) : Richard Caprioli et al.

Page 1 of 1

It is certified that error appears in the above-identified patent and that said Letters Patent is hereby corrected as shown below:

In the Specification

In Column 1, after Line 9 insert:
--GOVERNMENT FUNDING
This invention was made with government support under grant numbers GM058008 and GM103391 awarded by the National Institutes of Health. The government has certain rights in the invention.--

Signed and Sealed this
Twenty-second Day of October, 2019

Andrei Iancu
*Director of the United States Patent and Trademark Office*